(12) United States Patent
Ramamoorthy

(10) Patent No.: US 11,698,732 B2
(45) Date of Patent: Jul. 11, 2023

(54) STORAGE PROVISIONING IN A DATA STORAGE DEVICE

(71) Applicant: Micron Technology, Inc., Boise, ID (US)

(72) Inventor: Aravind Ramamoorthy, Rocklin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/180,245

(22) Filed: Feb. 19, 2021

(65) Prior Publication Data

US 2022/0269423 A1 Aug. 25, 2022

(51) Int. Cl.
*G06F 3/06* (2006.01)
*G06F 21/78* (2013.01)
*G06F 21/64* (2013.01)

(52) U.S. Cl.
CPC .......... *G06F 3/0629* (2013.01); *G06F 3/0604* (2013.01); *G06F 3/067* (2013.01); *G06F 3/0619* (2013.01); *G06F 3/0652* (2013.01); *G06F 3/0653* (2013.01); *G06F 21/64* (2013.01); *G06F 21/78* (2013.01)

(58) Field of Classification Search
CPC .... G06F 3/0629; G06F 3/0604; G06F 3/0619; G06F 3/0652; G06F 3/0653; G06F 3/067; G06F 21/64; G06F 21/78
See application file for complete search history.

(56) References Cited

U.S. PATENT DOCUMENTS

| | | | | |
|---|---|---|---|---|
| 10,447,483 | B1* | 10/2019 | Su | ............................ G06F 8/65 |
| 2006/0271726 | A1* | 11/2006 | Gan | ................ G06K 19/07732 |
| | | | | 711/103 |
| 2010/0332560 | A1* | 12/2010 | Gerbasi, III | ....... H04N 21/4335 |
| | | | | 707/812 |
| 2012/0317334 | A1* | 12/2012 | Suzuki | ................ G06F 12/0246 |
| | | | | 711/E12.008 |
| 2017/0118023 | A1* | 4/2017 | Gussen | ................... H04L 63/06 |
| 2018/0373645 | A1* | 12/2018 | Anderson | ........... G06F 12/0831 |
| 2021/0216446 | A1* | 7/2021 | Yang | ................... G06F 12/0882 |
| 2021/0360044 | A1* | 11/2021 | Cooper | .............. H04L 65/4084 |
| 2021/0383376 | A1* | 12/2021 | Silvestri | ................ H04L 9/0643 |
| 2022/0058057 | A1* | 2/2022 | Lu | ......................... G06F 9/5016 |

* cited by examiner

*Primary Examiner* — Hiep T Nguyen
(74) *Attorney, Agent, or Firm* — Greenberg Traurig

(57) ABSTRACT

Systems and methods for modifying a usage limit of a data storage device include a host interface; integrated circuit memory cells; and a processing device coupled to the host interface to provide commands with addresses to access the integrated circuit memory cells according to the address, and configured to execute firmware to perform: operations requested by commands received via the host interface; and updates to a usage limit of the data storage device.

20 Claims, 4 Drawing Sheets

STORAGE PROVISIONING IN A DATA STORAGE DEVICE

FIELD OF THE TECHNOLOGY

At least some embodiments disclosed herein relate generally to data storage devices, and, more particularly, to storage provisioning for data storage devices.

BACKGROUND

Data storage devices include a storage capacity. Typically, different data storage devices can be manufactured with different storage capacities to meet the storage needs of a particular application. Similarly, data storage devices have an endurance limit (i.e., maximum number of writes or erases per day). Different data storage devices can be manufactured with different endurance limits to meet the data processing needs of a particular application.

BRIEF DESCRIPTION OF THE DRAWINGS

References are made to the accompanying drawings that form a part of this disclosure and illustrate embodiments in which systems and methods described in this Specification can be practiced.

DETAILED DESCRIPTION

Figure 1:
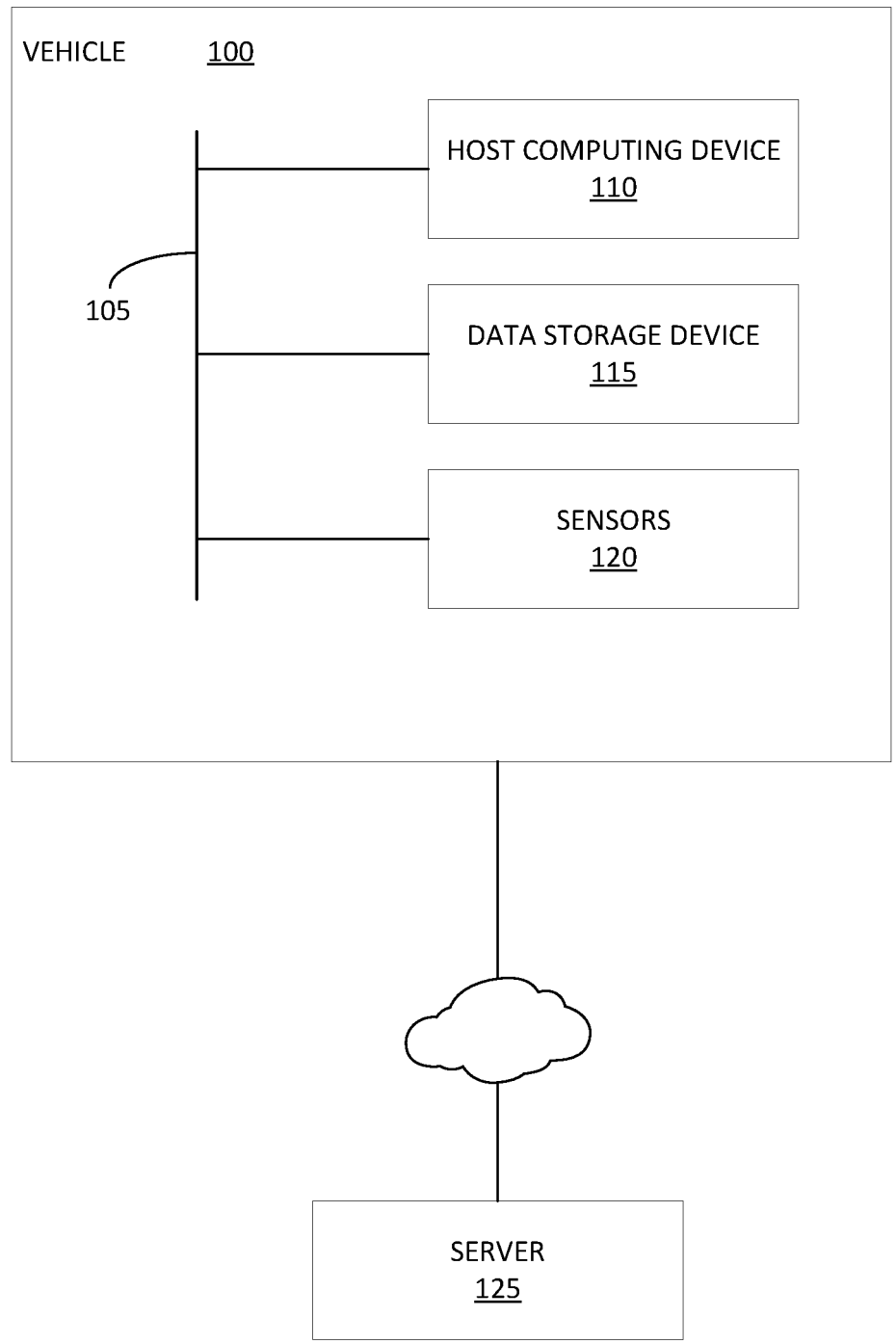
FIG. 1 is a schematic block diagram of a system having computing devices connected via a communications bus, according to an embodiment.

Generally, a data storage device is manufactured with set usage limits (e.g., a set storage capacity, a set endurance limit, or the like). The entire usage limit is generally available to the user. For example, a storage capacity may be 64 gigabytes (GB) and the user may be able to store up to 64 GB of data on the data storage device. Similarly, a data storage device can be manufactured with a set endurance limit. A number of writes or erases per day can be performed up to the selected endurance limit. For example, the selected endurance limit may be 1 drive-write-per-day (DWPD) and, again assuming a storage capacity of 64 GB, the user may write up to the endurance limit of 64 GB of data per day.

Embodiments described herein relate to data storage devices having modifiable usage limits (e.g., a modifiable storage capacity, modifiable endurance limit, combinations thereof, or the like). The data storage devices may be selectively modifiable to increase or decrease a usage limit of the data storage device. As a result, the user may have access to less than the usage limit (e.g., less than the entire storage capacity of the data storage device or less than the endurance limit). For example, a data storage device can be manufactured with a 10 terabyte (TB) physical memory space. However, the data storage device can be configured to function as if only 1 TB of physical memory space was available. The user may be able to later purchase additional physical memory space (e.g., another 1 TB for 2 TB total) and pay a fee via a server. The server can then send a command to the data storage device to reconfigure the data storage device so that the data storage device now appears to have 2 TB physical memory space available to the user. The data storage device can verify that the command originated from the appropriate server via, for example, a digital signature of the server, before accepting and executing the modification command from the server. For example, the command can include one or more bits that indicate a digital signature of the server. Similarly, the user may be able to cancel the purchase of additional physical memory space via the server. The server can then send a command to the data storage device to reconfigure the data storage device so that the data storage device now appears to have 1 TB physical memory space available to the user. The user may be able to modify the usage limit via the server as the user's needs for the data storage device change. As used herein, modifying the usage limit includes modifying an accessible usage limit. That is, the actual usage limit (e.g., storage capacity or endurance limit) of the data storage device is not changing, but the apparent usage limit available for the data storage device to use is modified.

Data storage devices can be used in a variety of applications such as, but not limited to, on board vehicles (e.g., automobiles). The data storage devices can be used for various vehicle systems including, but not limited to, the engine, the infotainment system, as a data recorder, combinations thereof, or the like.

Systems and methods for controlling a usage limit (e.g., a storage capacity, an endurance limit, combinations thereof, or the like) are described.

In an embodiment, a system includes a data storage device having a usage limit, configured to receive a modified usage limit and update the usage limit to be the modified usage limit. The data storage device includes a host interface; integrated circuit memory cells; and a processing device coupled to the host interface to provide commands with addresses to access the integrated circuit memory cells according to the address. The processing device is configured to execute firmware to perform operations requested by commands received via the host interface; and updates to the usage limit of the data storage device. The system includes a server communicable with the data storage device over a network, wherein the server is configured to send a command to the data storage device to update the usage limit of the data storage device.

In an embodiment, a data storage device includes a host interface; integrated circuit memory cells; and a processing device coupled to the host interface to provide commands with addresses to access the integrated circuit memory cells according to the address. The processing device is configured to execute firmware to perform operations requested by commands received via the host interface; and updates to a usage limit of the data storage device.

In an embodiment, a method includes receiving a command to modify a usage limit of a data storage device from a server connected in communication with the data storage device via a network, the command including a modified usage limit. The method includes identifying one or more bits of the command that indicate a digital signature of the server. The usage limit of the data storage device is updated according to the modified usage limit based at least in part on identifying the one or more bits that indicate the digital signature.

It is to be appreciated that the systems and methods described are applicable in systems other than a vehicle in accordance with the principles described herein.

FIG. 1 is a schematic block diagram of a vehicle 100 having computing devices connected via a communications bus 105, according to an embodiment. The computing devices include at least a host computing device 110 and a data storage device 115, according to an embodiment. In an embodiment the vehicle 100 is an automobile and can, for example, be an autonomous vehicle, a semiautonomous vehicle, or the like.

The host computing device 110 may be representative of, for example, various computing devices in the vehicle 100. For example, the host computing device 110 can be an infotainment system; a black box data recorder; an advanced driver assistance system (ADAS); an engine controller; a camera system; a storage service; suitable combinations thereof, or the like.

The host computing device 110 is communicatively coupled to the data storage device 115 via the communications bus 105. The communications bus 105 can utilize a selected communication protocol such as, but not limited to, peripheral component interconnect (PCI); peripheral component interconnect express (PCIe); or the like.

In the illustrated embodiment, the vehicle 100 further includes sensors 120. The host computing device 110 is communicatively coupled to the sensors 120. The sensors 120 are illustrated as being communicatively coupled to the host computing device 110 via the communications bus 105. In an embodiment, one or more of the sensors 120 can be communicatively coupled to the host computing device 110 via a wireless connection, or via a combination of a wireless connection and the wired connection of the communications bus 105.

The sensors 120 may be configured to collect information related to the operation of the vehicle 100. For example, the sensors 120 may be configured to collect information related to the speed, acceleration, deceleration, etc., of the vehicle 100. In an embodiment, the vehicle 100 may additionally include one or more actuators to, for example, exert control on at least a portion of the vehicle 100 in response to one or more values received from the sensors 120. In an embodiment, the sensors 120 may be configured to stream sensed values to the data storage device 115 for storage.

The vehicle 100 can include additional features such as, a power source. In an embodiment, the power source can be a battery that is electrically connected to the host computing device 110 and to the data storage device 115. It is to be appreciated that the vehicle 100 can include a variety of additional features.

The vehicle 100 can electronically communicate with a server 125. In an embodiment, the vehicle 100 can electronically communicate with the server 125 via a network such as the Internet, a cellular network, or the like. The vehicle 100 can communicate with the server 125 on a periodic basis. In an embodiment, when in communication with the server 125, a usage limit of the data storage device 115 can be modified based on a command from the server 125. In an embodiment, a user may log in to the server 125 to select a modification to usage limit. In an embodiment, the user may log in to the server 125 and purchase an increased usage limit. In an embodiment, the server 125 can be configured to auto-generate a command to return a modified usage limit to an original usage limit in response to determining that, for example, a payment has not been made (e.g., if the payment is a subscription-based payment).

The data storage device 115 receives a command from the server 125 to modify the usage limit of the data storage device 115. The command from the server 125 can include one or more bits that indicate a digital signature of the server. In an embodiment, the data storage device 115 can verify the digital signature of the server 125 prior to executing the modification to the usage limit.

The server 125 provides the command for modifying the usage limit, according to an embodiment. In an embodiment, the command from the server 125 can include one or more bits that indicate a digital signature of the server 125. In an embodiment, the host computing device 110 can pass the command from the server 125 to the data storage device 115. The host computing device 110 does not have the capability to change the usage limit of the data storage device 115 without the command from the server 125.

Figure 2:
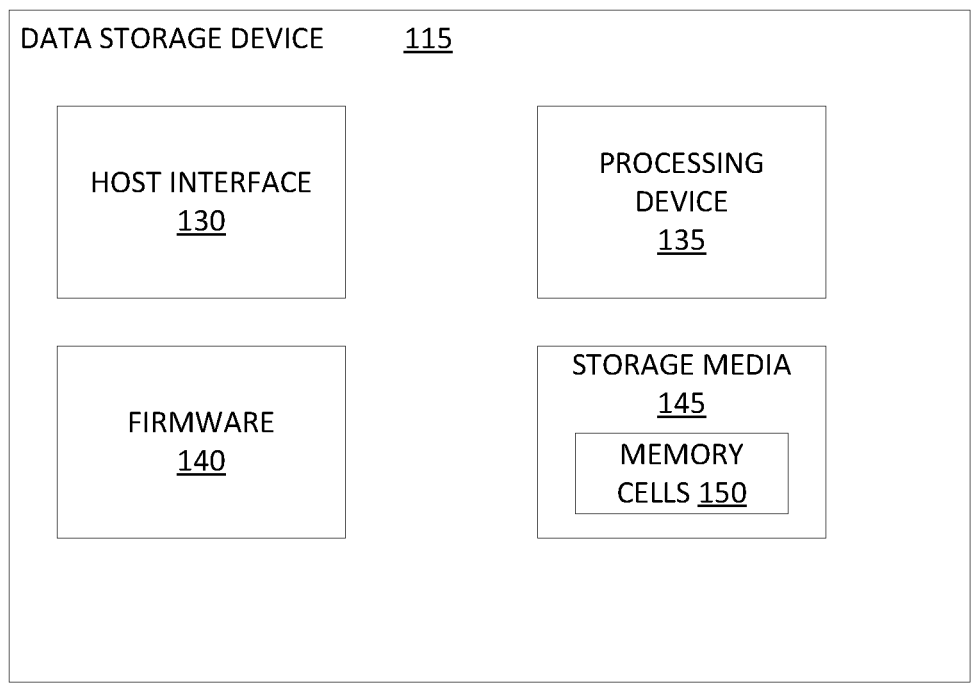
FIG. 2 is a block diagram of the data storage device of FIG. 1, according to an embodiment.

FIG. 2 is a block diagram of the data storage device 115 of FIG. 1, according to an embodiment. In an embodiment, the data storage device 115 is a solid-state drive (SSD). In another embodiment, the data storage device 115 can be a hard disk drive (HDDs); flash memory; dynamic random-access memory (DRAM); magnetic tape; network attached storage device; or the like.

The data storage device 115 includes a host interface 130, a processing device 135, firmware 140, and storage media 145.

The host interface 130 is communicatively coupled to the communications bus 105 (FIG. 1). The host interface 130 can be, for example, in a form of a standardized interface such as, but not limited to, a serial advanced technology attachment (SATA); a universal serial bus (USB); a peripheral component interconnect express (PCIe); or the like. The host interface 130 communicates information between the host computing device 110 and the storage media 145.

The host interface 130 is responsible for passing control, access, data, and other signals between the data storage device 115 and the host computing device 110 (FIG. 1).

The processing device 135 runs firmware 140 to perform operations responsive to the communications from the host computing device 110. Firmware 140 includes, for example, a type of computer program that provides control, monitoring, and data manipulation of data storage devices. The firmware 140 controls operations of the processing device 135 in operating the data storage device 115, such as storing and accessing data in the storage media 145.

In an embodiment, the firmware 140 can be configured to include instructions for controlling a usage limit of the data storage device 115. For example, the firmware 140 can include a percentage amount of the storage capacity of the storage media 145. In an embodiment, the firmware 140 can include a specific storage capacity which is equal to or less than the storage capacity of the storage media 145 which is available to the user. The firmware 140 can include a percentage amount of the endurance limit or can include a specific endurance limit that is less than or equal to the endurance capabilities of the storage media 145.

In an embodiment, the data storage device 115 can be connected to a server 125 via a network. In response to a modification instruction from the server 125, the firmware 140 can be updated to include a modified usage limit. In an embodiment, the firmware 140 may not be updated to control the usage limit of the data storage device 115. For example, in an embodiment, the processing device 135 can impose the usage limit on the data storage device 115. In such an embodiment, the processing device 135 can also be configured to recognize one or more bits in commands from the server 125 that indicate a digital signature of the server 125 and verify the digital signature of the server 125, then impose the usage limit during the operation of the data storage device 115.

At least a portion of the storage media 145 is non-volatile. That is, the storage media 145 does not require power to maintain the data or information stored in the storage media 145 and the data or information is retrievable after the storage media 145 is powered off and then powered on again. Memory cells 150 of the storage media 145 can be implemented using, for example, NAND gate-based flash memory; phase-change memory (PCM); magnetic memory (MRAM); resistive random-access memory; 3D XPoint; or the like. As a result, the storage media 145 is non-volatile and can retain data stored therein without power for days, months, or years. In an embodiment, the memory cells 150 can be single-layer cells (SLCs); multi-layer cells (MLCs); triple-layer cells (TLCs); quad-layer cells (QLCs); or the like.

The data storage device 115 may utilize volatile memory for the storage of run-time data and instructions used by the processing device 135. For example, volatile dynamic random-access memory (DRAM); volatile static random-access memory (SRAM); or the like can be used. The volatile memory requires power to maintain the data or information stored therein, and the data or information is rapidly or immediately lost when the power is interrupted. In an embodiment, the processing device 135 can alternatively or additionally include in-process cache memory.

In an embodiment, the data storage device 115 can periodically connect to the server 125 to verify whether there are any changes to the usage limit. In an embodiment, commands from the server 125 can be pushed to the data storage device 115 when the data storage device 115 is connected to a network. That is, the data storage device 115 may not poll for updates to the usage limit.

A non-transitory computer storage medium can be used to store instructions of the firmware 140. When the instructions are executed by the processing device, the instructions cause the processing device to perform a method discussed in further detail below.

Figure 3:
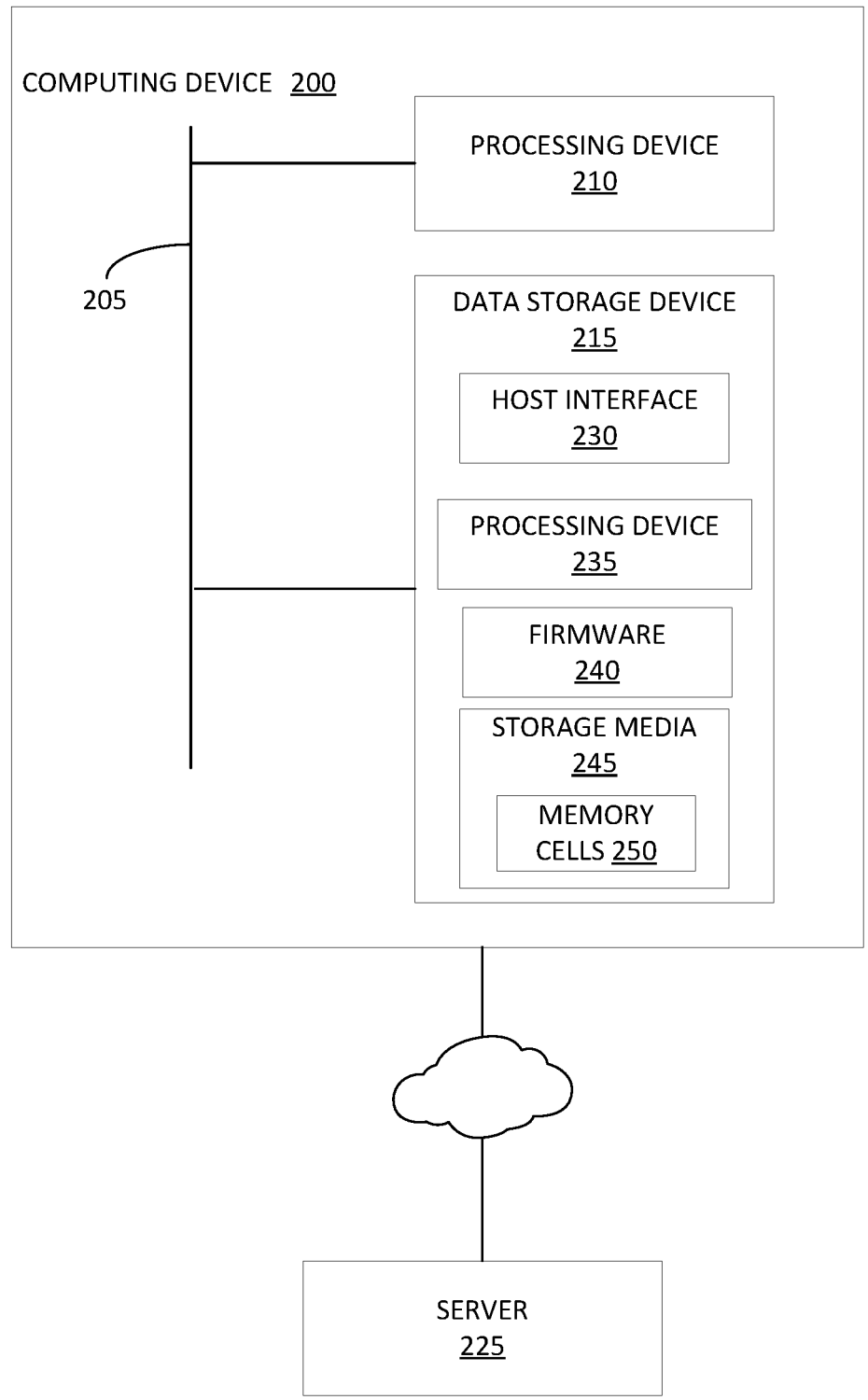
FIG. 3 is a schematic block diagram of a system including a data storage device, according to an embodiment.

FIG. 3 is a schematic block diagram of a computing device 200 having components connected via a communications bus 205, according to an embodiment. The components include at least a processing device 210 and a data storage device 215, according to an embodiment. In an embodiment the computing device 200 is a mobile device such as a smartphone, a tablet device, a wearable device (e.g., a smartwatch or other wearable device), or the like.

The processing device 210 is communicatively coupled to the data storage device 215 via the communications bus 205. The communications bus 205 can utilize a selected communication protocol such as, but not limited to, peripheral component interconnect (PCI); peripheral component interconnect express (PCIe); or the like.

The computing device 200 can include additional features such as, a power source. In an embodiment, the power source can be a battery that is electrically connected to the processing device 210 and to the data storage device 215. It is to be appreciated that the computing device 200 can include a variety of additional features.

The computing device 200 can electronically communicate with a server 225. In an embodiment, the vehicle 100 can electronically communicate with the server 225 via a network such as the Internet, a cellular network, or the like. The computing device 200 can communicate with the server 225 on a periodic basis. In an embodiment, when in communication with the server 225, a usage limit can be modified based on a command from the server 225. In an embodiment, a user may log in to the server 225 to select a modification to the usage limit. In an embodiment, the user may log in to the server 225 and purchase an increased usage limit. In an embodiment, the server 225 can be configured to auto-generate a command to return a modified usage limit to an original usage limit in response to determining that, for example, a payment has not been made (e.g., if the payment is a subscription-based payment).

The data storage device 215 receives a command from the server 225 to modify the usage limit of the data storage device 215. In an embodiment, the command can include one or more bits that indicate a digital signature of the server 225 and the data storage device 215 can verify a digital signature of the server 225 prior to executing the modification to the usage limit.

The server 225 provides the command for modifying the usage limit, according to an embodiment. In an embodiment, the processing device 210 can pass the command from the server 125 to the data storage device 215. The processing device 210 does not have the capability to change the usage limit of the data storage device 215 without the command from the server 225.

In an embodiment, the data storage device 215 is a solid-state drive (SSD). In another embodiment, the data storage device 215 can be a hard disk drive (HDDs); flash memory; dynamic random-access memory (DRAM); magnetic tape; network attached storage device; or the like.

The data storage device 215 includes a host interface 230, firmware 240, and storage media 245.

The host interface 230 is communicatively coupled to the communications bus 205. The host interface 230 can be, for example, in a form of a standardized interface such as, but not limited to, a serial advanced technology attachment (SATA); a universal serial bus (USB); a peripheral component interconnect express (PCIe); or the like. The host interface 230 communicates information between the processing device 210 and the storage media 245.

The host interface 230 is responsible for passing control, access, data, and other signals between the data storage device 215 and the processing device 210.

The processing device 210 runs firmware 240 to perform operations. Firmware 240 includes, for example, a type of computer program that provides control, monitoring, and data manipulation of data storage devices. The firmware 240 controls operations of the processing device 210 in operating the data storage device 215, such as storing and accessing data in the storage media 245.

The firmware 240 can be configured to include instructions for controlling a usage limit of the data storage device 215. For example, the firmware 240 can include a percentage amount of the storage capacity of the storage media 245. In an embodiment, the firmware 240 can include a specific storage capacity which is equal to or less than the storage capacity of the storage media 245 which is available to the user. The firmware 240 can include a percentage amount of the endurance limit or can include a specific endurance limit that is less than or equal to the endurance capabilities of the storage media 245.

In an embodiment, the data storage device 215 can be connected to the server 225 via a network. In response to a modification instruction from the server 225, the firmware 240 can be updated to include a modified usage limit. In an embodiment, the firmware 240 may not be updated to control the usage limit of the data storage device 215. For example, in an embodiment, a processing device 235 such as a controller for the data storage device 215 can impose the usage limit on the data storage device 215. In such an embodiment, the processing device 235 can also be configured to recognize one or more bits in commands from the server 225 that indicate a digital signature of the server 125 and verify the digital signature of the server 225, then impose the usage limit during the operation of the data storage device 215.

At least a portion of the storage media 245 is non-volatile. That is, the storage media 245 does not require power to maintain the data or information stored in the storage media 245 and the data or information is retrievable after the storage media 245 is powered off and then powered on again. Memory cells 250 of the storage media 245 can be implemented using, for example, NAND gate-based flash memory; phase-change memory (PCM); magnetic memory (MRAM); resistive random-access memory; 3D XPoint; or the like. As a result, the storage media 245 is non-volatile and can retain data stored therein without power for days, months, or years. In an embodiment, the memory cells 250 can be single-layer cells (SLCs); multi-layer cells (MLCs); triple-layer cells (TLCs); quad-layer cells (QLCs); or the like.

The data storage device 215 may utilize volatile memory for the storage of run-time data and instructions used by the processing device 210. For example, volatile dynamic random-access memory (DRAM); volatile static random-access memory (SRAM); or the like can be used. The volatile memory requires power to maintain the data or information stored therein, and the data or information is rapidly or immediately lost when the power is interrupted. In an embodiment, the processing device 210 can alternatively or additionally include in-process cache memory.

In an embodiment, the processing device 210 can periodically connect to the server 225 to verify whether there are any changes to the usage limit. In an embodiment, commands from the server 225 can be pushed to the data storage device 215 when the data storage device 215 is connected to a network. That is, the data storage device 215 may not poll for updates to the usage limit.

A non-transitory computer storage medium can be used to store instructions of the firmware 240. When the instructions are executed by the processing device, the instructions cause the processing device to perform a method discussed in further detail below.

Figure 4:
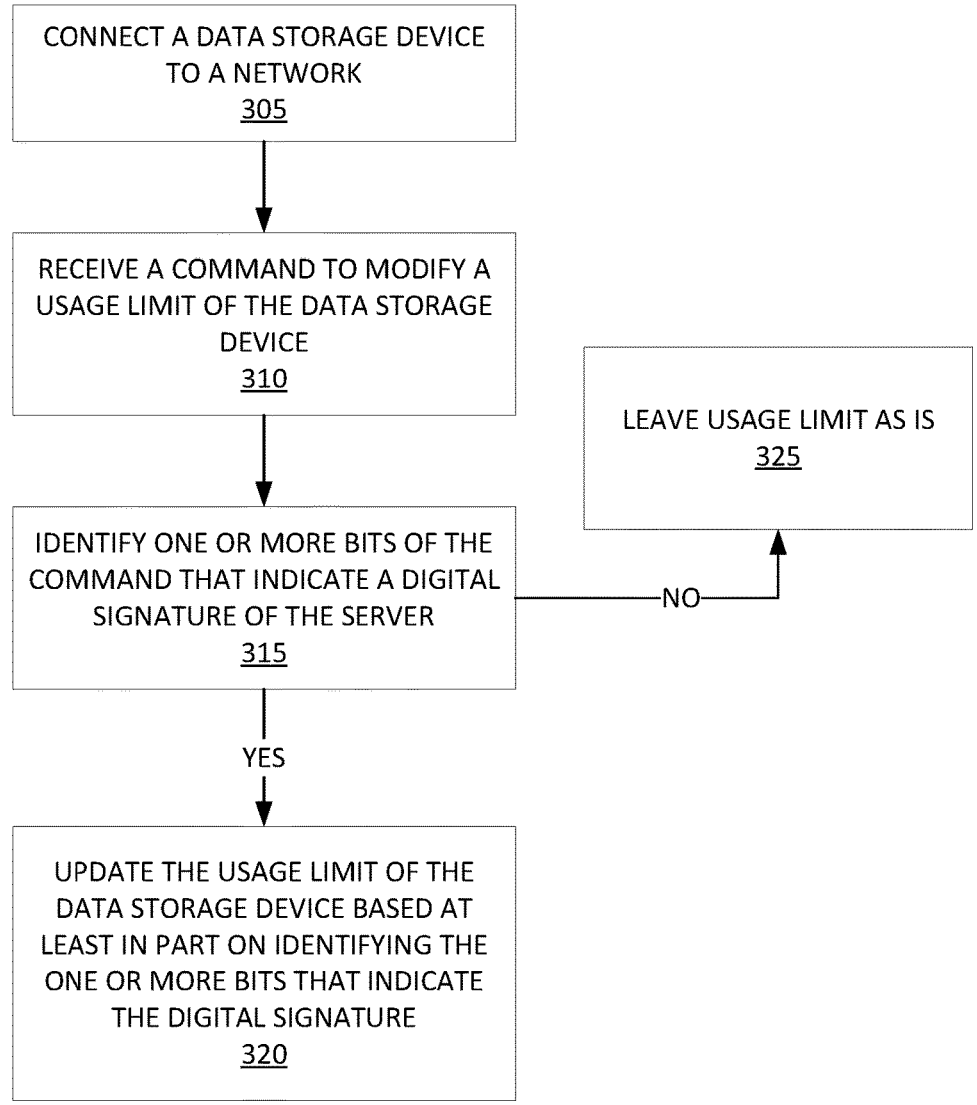
FIG. 4 is a flowchart of a method for provisioning a data storage device, according to an embodiment.

FIG. 4 is a flowchart of a method 300 for provisioning a data storage device, according to an embodiment. The method 300 may be performed for the data storage device 115 (FIGS. 1, 2) or the data storage device 215 (FIG. 3). The method 300 generally can be performed to modify usage limit (e.g., a storage capacity, an endurance limit, combination thereof, or the like).

At block 305, a computing device including a data storage device (e.g., the vehicle 100 (FIG. 1) or the computing device 200 (FIG. 2)) can connect to a server (e.g., the server 125 (FIG. 1) or server 225 (FIG. 2)) via a network.

At block 310, the computing device receives a command to modify a usage limit of the data storage device. As described herein, the usage limit can include a storage capacity, an endurance limit, combinations thereof, or the like. For example, at block 310, the computing device receives a command from the server including a modified usage limit. In an embodiment, the server can include a flag or other indicator to note whether a user has logged in and requested a change to the storage capacity of the user's data storage device. The command to modify the usage limit of the storage device provided from the server can include one or more bits representative of a digital signature.

At block 315, in response to receiving the command from the server including a modified usage limit, the method 300 identifies one or more bits of the command that indicate a digital signature of the server. For example, this can be to ensure that the command to modify the usage limits of the data storage device is coming from the expected server and not an imposter.

In some embodiments, the data storage device can include a cryptographic key to verify whether a received signature associated with the command received matches with the received message. In some embodiments, the server can have a private key and share a public key (e.g., with the data storage device). In such embodiments, the server can generate a digital signature using the private key by hashing the message into a hash value and use the private key to encrypt the hash value as the digital signature. The data storage device can decrypt the digital signature to recover the received hash value and compare it to the hash value of the received message. If there is a match, the data storage device can conclude that the message has not been changed since the generation of the digital signature; and the digital signature was generated using the private key (that is known only to the server). It is to be appreciated that usage of a digital signature utilizing public-private key encryption is an example of how the data storage device can very whether the command came from the server and not an imposter. Other methods of ensuring the server is the sender of the message by the data storage device are also within the scope of this disclosure.

At block 320, the usage limit of the data storage device is updated based at least in part on identifying the one or more bits that indicate the digital signature. In an embodiment, this can include the processing device receiving a firmware update with an indication of the change in the usage limit. In an embodiment, updating the usage limit of the storage device can include storing the modified usage limit in a location of the storage media of the data storage device. That is, the usage limit can be stored in the storage media of the data storage device and updated as commands are received from the server. Then, in operation, the data storage device can utilize the modified usage limit. In such an embodiment, an update to the firmware can be avoided. The usage limit can be changed in either direction (i.e., an increase or a decrease).

If at block 315 the one or more bits of the command that indicate the digital signature of the server are not identified, at block 325 the method 300 leaves the usage limit as is. This can, for example, prevent an imposter from making changes to the usage limit of the data storage device.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method, comprising:
   receiving a command to modify a usage limit of a data storage device from a server connected in communication with the data storage device via a network, the command including a modified usage limit;
   identifying one or more bits of the command that indicate a digital signature of the server; and
   updating the usage limit of the data storage device according to the modified usage limit based at least in part on identifying the one or more bits that indicate the digital signature.

2. The method of claim 1, wherein updating the usage limit of the data storage device includes updating firmware of the data storage device.

3. The method of claim 1, wherein updating the usage limit of the data storage device includes updating a storage capacity, an endurance limit, or combination thereof.

4. The method of claim 1, wherein updating the usage limit of the data storage device includes storing the modified usage limit in a memory space of the data storage device.

5. A data storage device, comprising:
   a host interface;
   integrated circuit memory cells; and
   a processing device coupled to the host interface to provide commands with addresses to access the integrated circuit memory cells according to the address, and configured to execute firmware to perform:
     operations requested by commands received via the host interface from a server; and
     updates to a usage limit of the data storage device, wherein the updates are based on a digital signature of the server in at least one command of the commands.

6. The data storage device of claim 5, wherein the commands to access integrated circuit memory cells include write, erase, or combinations thereof.

7. The data storage device of claim 5, wherein a modified usage limit is greater than the usage limit.

8. The data storage device of claim 5, wherein the data storage device is configured to receive a modified usage limit in response to connecting to a network.

9. The data storage device of claim 8, wherein the data storage device is configured to:
   receive at least one command including the modified usage limit from the server;
   identify one or more bits of the command that indicate the digital signature of the server; and
   update the usage limit based at least in part on identifying the one or more bits that indicate the digital signature.

10. The data storage device of claim 5, wherein the usage limit includes a storage capacity, an endurance limit, or combinations thereof.

11. The data storage device of claim 5, wherein the data storage device is on board a vehicle.

12. The data storage device of claim 5, wherein the data storage device is in a mobile computing device.

13. A system, comprising:
    a data storage device having a usage limit, configured to receive a modified usage limit and update the usage limit to be the modified usage limit, and including:
      a host interface; and
      integrated circuit memory cells; and
    a processing device coupled to the host interface to provide commands with addresses to access the integrated circuit memory cells according to the address, and configured to execute firmware to perform:
      operations requested by commands received via the host interface; and
      updates to the usage limit of the data storage device; and
    a server communicable with the data storage device over a network, wherein the server is configured to send a command to the data storage device to update the usage limit of the data storage device, wherein the usage limit is updated based on a digital signature in the command that is associated with the server.

14. The system of claim 13, wherein the commands to access integrated circuit memory cells include write, erase, or combinations thereof.

15. The system of claim 13, wherein the modified usage limit is greater than the usage limit.

16. The system of claim 13, wherein the data storage device is configured to receive the modified usage limit of the data storage device in response to connecting to the network.

17. The system of claim 13, wherein the usage limit includes a storage capacity, an endurance limit, or combinations thereof.

18. The system of claim 13, wherein the processing device is configured to identify one or more bits of the command that indicate the digital signature of the server, and update the usage limit of the data storage device based at least in part on identifying the one or more bits that indicate the digital signature.

19. The system of claim 13, comprising a vehicle, wherein the data storage device is on board the vehicle.

20. The system of claim 13, comprising a mobile computing device, wherein the data storage device is on board the mobile computing device.

* * * * *